United States Patent
Lee et al.

(10) Patent No.: US 10,560,654 B2
(45) Date of Patent: Feb. 11, 2020

(54) DISPLAY DEVICE

(71) Applicant: LG ELECTRONICS INC., Seoul (KR)

(72) Inventors: Eunjung Lee, Seoul (KR); Taeyoung Kim, Seoul (KR); Minjae Kim, Seoul (KR); Sijin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 15/710,762

(22) Filed: Sep. 20, 2017

(65) Prior Publication Data
US 2019/0089925 A1    Mar. 21, 2019

(51) Int. Cl.
*H04N 5/64* (2006.01)
*H04N 5/33* (2006.01)
*H04N 7/06* (2006.01)

(52) U.S. Cl.
CPC ............... *H04N 5/642* (2013.01); *H04N 5/33* (2013.01); *H04N 7/06* (2013.01)

(58) Field of Classification Search
CPC ............. H04N 5/642; H04N 7/06; H04N 5/33
See application file for complete search history.

(56) References Cited

U.S. PATENT DOCUMENTS

| | | | |
|---|---|---|---|
| 10,015,739 B2* | 7/2018 | Yoon | G06F 1/3209 |
| 2002/0122027 A1* | 9/2002 | Kim | G06F 3/04812 345/167 |
| 2009/0262256 A1* | 10/2009 | Asayama | H04N 5/60 348/738 |
| 2010/0066920 A1* | 3/2010 | Kwak | G06F 3/04886 348/734 |
| 2010/0184379 A1* | 7/2010 | Shimomura | H04W 88/16 455/41.3 |
| 2010/0214479 A1* | 8/2010 | Koike | H04N 21/4113 348/553 |
| 2010/0325409 A1* | 12/2010 | Kim | G06F 9/4401 713/2 |
| 2014/0055251 A1* | 2/2014 | Son | G08C 17/02 340/12.54 |

(Continued)

FOREIGN PATENT DOCUMENTS

JP 2017127834 A * 7/2017
KR 101081532 11/2011

(Continued)

OTHER PUBLICATIONS

PCT International Application No. PCT/KR2017/007272, International Search Report dated Apr. 2, 2018, 3 pages.

*Primary Examiner* — Richard A Hansell, Jr.
(74) *Attorney, Agent, or Firm* — Lee, Hong, Degerman, Kang & Waimey PC

(57) ABSTRACT

A display device includes a display unit, a Bluetooth module configured to perform Bluetooth communication with a remote control device or a mobile terminal, an IR module configured to receive an IR signal from the remote control device, and a controller configured to control the display unit, the Bluetooth module and the IR module. The controller may transmit, to the remote control device, a Bluetooth connection stop request signal for breaking Bluetooth connection with the remote control device, if the display device enters a speaker mode for outputting audio played by the mobile terminal.

16 Claims, 14 Drawing Sheets

(56) References Cited

U.S. PATENT DOCUMENTS

| | | | |
|---|---|---|---|
| 2015/0350773 A1* | 12/2015 | Yang | H04N 21/43615 |
| | | | 381/77 |
| 2016/0006864 A1* | 1/2016 | Park | H04N 21/4126 |
| | | | 715/835 |
| 2016/0057553 A1* | 2/2016 | Ryu | H04M 1/6066 |
| | | | 340/4.41 |
| 2016/0353151 A1* | 12/2016 | Majid | H04N 21/4263 |
| 2017/0085948 A1 | 3/2017 | Kang et al. | |
| 2018/0102048 A1* | 4/2018 | Greene | G08C 17/02 |
| 2019/0007574 A1* | 1/2019 | Takarabe | H04W 52/0225 |

FOREIGN PATENT DOCUMENTS

| | | |
|---|---|---|
| KR | 1020150064756 | 6/2015 |
| KR | 1020160134147 | 11/2016 |
| KR | 1020170011763 | 2/2017 |
| WO | 2015130024 | 9/2015 |

* cited by examiner

EXTERNAL BLUETOOTH SPEAKER AND SOUND SHARING CANNOT BE SIMULTANEOUSLY USED. WOULD YOU LIKE TO CHANGE TO TV SPEAKER AND EXECUTE SOUND SHARING?

NO    YES

DISPLAY DEVICE

FIELD

The present invention relates to a display device and, more particularly, to a display device capable of outputting audio played by a mobile terminal through Bluetooth connection.

BACKGROUND

Digital TV services using a wired or wireless communication network have become common. The digital TV service can provide various services that could not be provided in an existing analog broadcast service.

For example, an Internet Protocol Television (IPTV) or a smart TV service, which is a type of a digital TV service, provides a bi-directional service that allows a user to actively select a type of a program to be watched, a watching time, and the like. The IPTV or the smart TV service may provide various additional services based on the bi-directionality, for example, Internet browsing, home shopping, online games, and the like.

In addition, recently, a TV may receive audio from a smartphone through Bluetooth communication and reproduce the received audio through a speaker. This is referred to as sound mirroring.

If a TV operates in a speaker mode according to sound mirroring, the TV is Bluetooth-connected to a smartphone as a slave device and is Bluetooth-connected to a magic remote controller as a master device.

In this case, the TV should operate as either a source device for transmitting audio or a sink device for outputting audio upon Bluetooth communication. However, the TV operates as both a master device and a slave device and thus performance thereof may deteriorate due to available channel movement through adaptive frequency hopping.

Therefore, movement of a cursor of the magic remote controller may not be stopped or output of audio received from the smartphone may be stopped.

SUMMARY

An object of the present invention is to provide a display device capable of preventing movement of a pointer of a remote control device from being stopped or output of audio received from a mobile terminal from being stopped upon Bluetooth audio sink operation.

According to an embodiment of the present invention, a display device includes a display unit, a Bluetooth module configured to perform Bluetooth communication with a remote control device or a mobile terminal, an IR module configured to receive an IR signal from the remote control device, and a controller configured to control the display unit, the Bluetooth module and the IR module. The controller transmits, to the remote control device, a Bluetooth connection stop request signal for breaking Bluetooth connection with the remote control device, if the display device enters a speaker mode for outputting audio played by the mobile terminal.

BRIEF DESCRIPTION OF THE DRAWINGS

FIGS. 10 to 12 are diagrams illustrating operation performed if a request for entering a speaker mode is received in a state in which a display device is connected to a sound bar according to an embodiment of the present invention.

DETAILED DESCRIPTION OF THE PREFERRED EMBODIMENT

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment, for example, as an intelligent display device having both of the broadcast reception function and the computer assisted function, may include more convenient user-friendly interface than a handwriting input device, a touch screen or space remote control device, and the like, by adding an Internet function while fulfilling a broadcasting receiving function. With the support of a wired or wireless Internet function, the display device can connect to the Internet and computers and perform functions such as e-mail, web browsing, banking, or games. In order to perform such various functions, standardized general-purpose OS can be used.

Accordingly, since various applications are freely added or deleted on a general purpose OS kernel, a display device described herein can perform various user-friendly functions. More specifically, the display device may be, for example, a network TV, a Hybrid Broadcast Broadband TV (HBBTV), a smart TV, a light-emitting diode (LED) TV, an organic light-emitting diode (OLED) TV, and so on, and may be applied to a smartphone in some cases.

Figure 1:
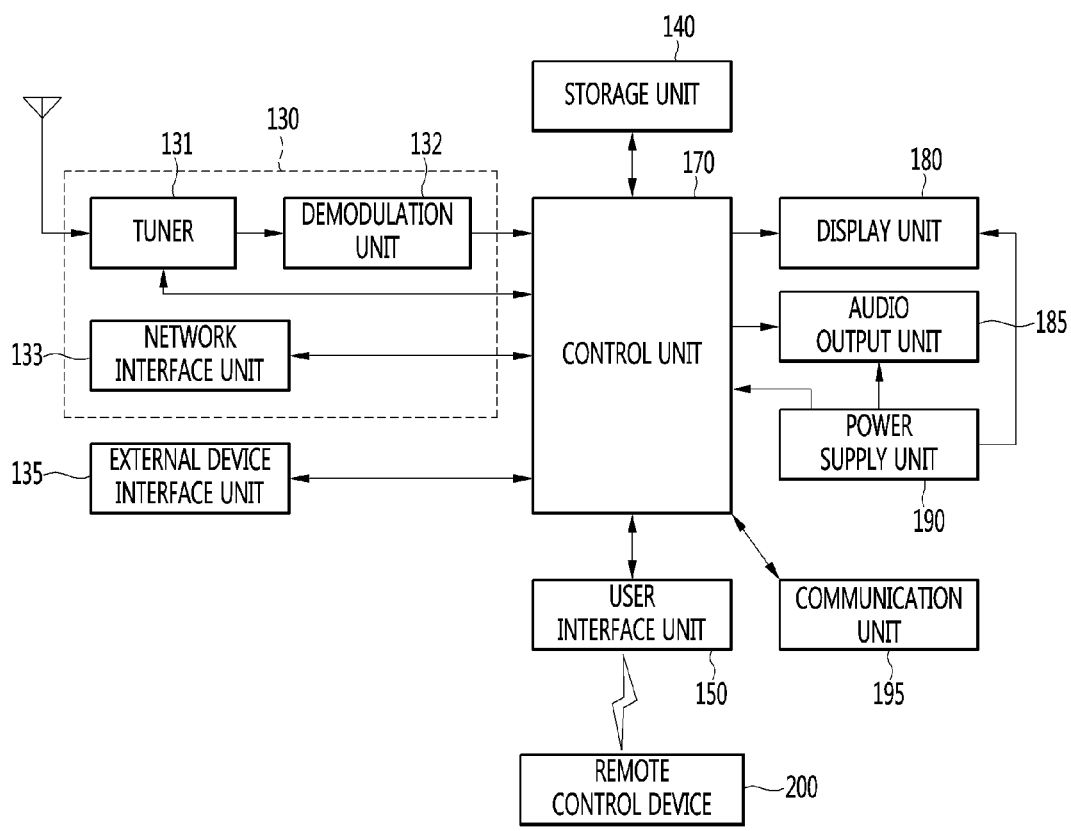
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, the display device 100 may include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list of an adjacent external device and transfer the application or the application list to the control unit 170 or the storage unit 140.

The external device interface unit 135 may provide a connection path between the display device 100 and an external device. The external device interface unit 135 may receive at least one of image and audio output from an external device that is wirelessly or wiredly connected to the display device 100 and deliver it to the control unit 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB memory, and a home theater system, but these are just exemplary.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

Additionally, the network interface unit 133 may transmit a part of content data stored in the display device 100 to a user or an electronic device selected from other users or other electronic devices preregistered in the display device 100.

The network interface unit 133 may access a predetermined webpage through an accessed network or another network linked to the accessed network. That is, the network interface unit 133 may access the predetermined webpage through the network and transmit or receive data to or from a corresponding server.

The network interface unit 133 may receive content or data provided by a content provider or a network operator. That is, the network interface unit 133 may receive content (e.g., movies, advertisements, games, VOD, broadcast signals, etc.) and content-related information provided by the content provider or the network operator through the network.

Additionally, the network interface unit 133 may receive update information and update files of firmware provided by the network operator and may transmit data to the Internet or content provider or the network operator.

The network interface unit 133 may select and receive a desired application among applications, which are open to the public, through the network.

The storage unit 140 may store a program for signal processing and control in the control unit 170 and may store signal-processed image, voice, or data signals.

Additionally, the storage unit 140 may perform a function for temporarily storing images, voices, or data signals input from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (e.g., moving image files, still image files, music files, document files, application files, etc.) stored in the storage unit 140 so as to provide the content files to the user.

The user input interface unit 150 may transfer signals input by the user to the control unit 170 or may transfer signals from the control unit 170 to the user. For example, the user input interface unit 150 may process control signals for power on/off, channel selection, screen setting, or the like, which is received from the remote control device 200, or transmit the control signals from the control unit 170 to the remote control device 200, according to various communication schemes such as Bluetooth scheme, an Ultra Wideband (WB) scheme, a ZigBee scheme, a Radio Frequency (RF) communication scheme, or an infrared (IR) communication scheme.

Additionally, the user input interface unit 150 may transfer, to the control unit 170, control signals input from local keys (not shown) such as a power key, a channel key, a volume key, and a setting key.

Image signals that are image-processed by the control unit 170 may be input to the display unit 180 and displayed as an image corresponding to the image signals. Additionally, image signals that are image-processed by the control unit 170 may be input to an external output device through the external device interface unit 135.

Voice signals that are processed by the control unit 170 may be output to the audio output unit 185. Additionally, voice signals that are processed by the control unit 170 may be input to an external output device through the external device interface unit 135.

In addition, the control unit 170 may control overall operations of the display device 100.

Additionally, the control unit 170 may control the display device 100 by a user command or internal program input through the user input interface unit 150 and may access the network to download an application or an application list desired by the user into the display device 100.

The control unit 170 may output channel information selected by the user through the display unit 180 or the audio output unit 185 together with the processed images or voice signals.

Additionally, the control unit 170 may output image signals or voice signals, which are input from the external device (e.g., a camera or a camcorder) through the external device interface unit 135, to the display unit 180 or the audio output unit 185 according to an external device image playback command received through the user input interface unit 150.

On the other hand, the control unit 170 may control the display unit 180 to display images. For example, the control unit 170 may control the display unit 180 to display broadcast images input through the tuner 131, external input images input through the external device interface unit 135, images input through the network interface unit, or images stored in the storage unit 140. In this case, an image displayed on the display unit 180 may be a still image or video, and may be a 2D image or a 3D image.

Additionally, the control unit 170 may perform control to play content stored in the video display device 100, received broadcast content, or external input content input from the outside. The content may be in various formats, such as broadcast images, external input images, audio files, still images, accessed web screens, and document files.

The wireless communication unit 173 may perform a wired or wireless communication with an external electronic device. The wireless communication unit 173 may perform short-range communication with an external device. To this end, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or interworking) with the display device 100. The wireless communication unit 173 can detect (or recognize) a communicable wearable device around the display device 100. Furthermore, if the detected wearable device is a device authenticated to communicate with the display device 100, the control unit 170 may transmit at least part of data processed in the display device 100 to the wearable device through the wireless communication unit 173. Accordingly, a user of the wearable device may use the data processed in the display device 100 through the wearable device.

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure, and thus, some of the components shown in FIG. 1 may be integrated, added, or omitted according to the specification of the actually implemented display device 100.

That is, if necessary, two or more elements may be integrated into one element, or one element may be divided into two or more elements. Additionally, a function performed by each block is provided for describing the embodiments of the present disclosure, and a specific operation or device thereof does not limit the scope of the present disclosure.

According to another embodiment of the present disclosure, the display device 100 may not include the tuner 131 and the demodulation unit 132, unlike that illustrated in FIG. 1, and may receive images through the network interface unit 133 or the external device interface unit 135 and play the received images.

For example, the display device 100 may be divided into an image processing device such as a set-top box for receiving broadcast signals or content according to various network services, and a content playback device for playing content input from the image processing device.

In this case, an operating method of a display device according to an embodiment of the present disclosure, as described below, may be performed by one of the display device 100 described with reference to FIG. 1, an image processing device such as the separated set-top box, and a content playback device including the display unit 180 and the audio output unit 185.

Next, the remote control device according to an embodiment of the present disclosure will be described with reference to FIGS. 2 and 3.

Figure 2:
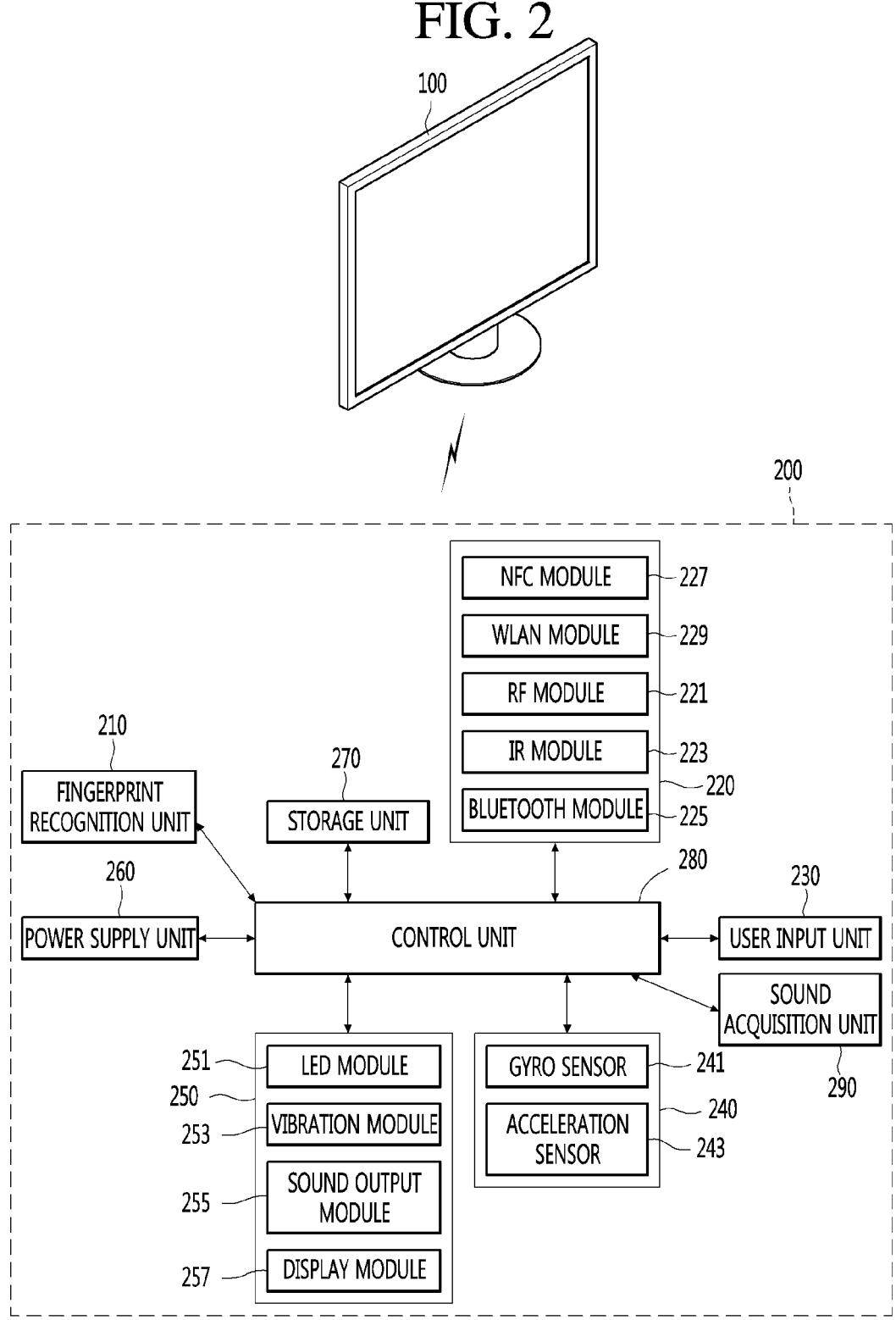
FIG. 2 is a block diagram of a remote control device according to an embodiment of the present disclosure.
Figure 3:
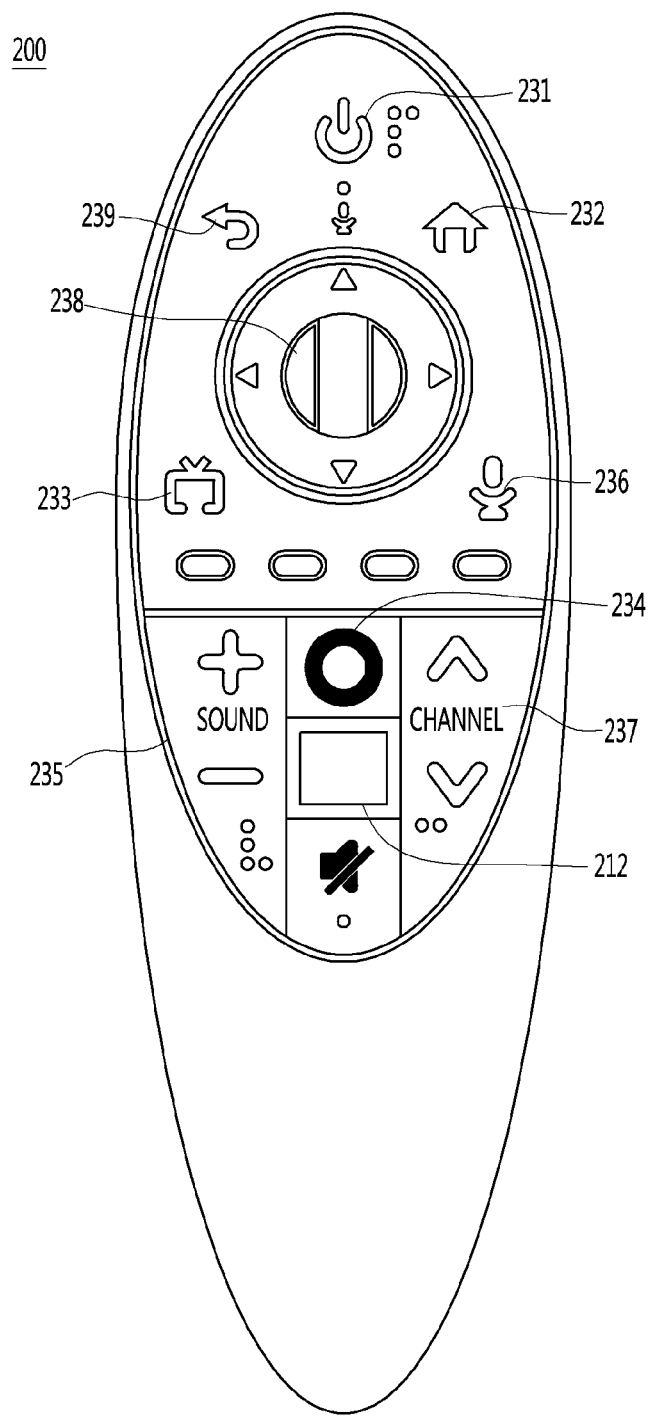
FIG. 3 illustrates an actual configuration example of the remote control device according to an embodiment of the present disclosure.

FIG. 2 is a block diagram of the remote control device according to an embodiment of the present disclosure, and FIG. 3 illustrates an actual configuration example of the remote control device according to an embodiment of the present disclosure.

First, referring to FIG. 2, the remote control device 200 may include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from any one of the display devices according to the above-mentioned embodiments of the present disclosure.

The remote control device 200 may include an RF module 221 for transmitting/receiving signals to/from the display device 100 according to an RF communication standard and an IR module 223 for transmitting/receiving signals to/from the display device 100 according to an IR communication standard. Additionally, the remote control device 200 may include a Bluetooth module 225 for transmitting/receiving signals to/from the display device 100 according to a Bluetooth communication standard. Additionally, the remote control device 200 may include a Near Field Communication (NFC) module 227 for transmitting/receiving signals to/from the display device 100 according to an NFC communication standard and a WLAN module 229 for transmitting/receiving signals to/from the display device 100 according to a Wireless LAN (WLAN) communication standard.

Additionally, the remote control device 200 may transmit signals containing information on a movement of the remote control device 200 to the display device 100 through the wireless communication unit 220.

On the other hand, the remote control device 200 may receive signals transmitted from the display device 100 through the RF module 221 and, if necessary, may transmit a command on power on/off, channel change, and volume change to the display device 100 through the IR module 223.

The user input unit 230 may include a keypad, a button, a touch pad, or a touch screen. A user may manipulate the user input unit 230 to input a command related to the video display device 100 to the remote control device 200. If the user input unit 230 includes a hard key button, a user may push the hard key button to input a command related to the display device 100 to the remote control device 200. Details thereof will be described below with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a check button 238, and a back button 239.

The fingerprint recognition button 212 may be a button for recognizing a user's fingerprint. According to an embodiment, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for adjusting a volume output from the display device 100. The voice recognition button 236 may be a button for receiving a user's voice and recognizing the received voice. The channel change button 237 may be a button for receiving broadcast signals of a specific broadcast channel. The check button 238 may be a button for selecting a specific function and the back button 239 can be a button for returning to a previous screen.

Referring again to FIG. 2, if the user input unit 230 includes a touch screen, a user may touch a soft key of the touch screen to input a command related to the display device 100 to the remote control device 200. Additionally, the user input unit 230 may include various types of input means that can be manipulated by a user, for example, a scroll key and a jog key, and this embodiment does not limit the scope of the present disclosure.

The sensor unit 240 may include a gyro sensor 241 or an acceleration sensor 243, and the gyro sensor 241 may sense information on a movement of the remote control device 200.

For example, the gyro sensor 241 may sense information on an operation of the remote control device 200 on the basis of x, y, and z axes, and the acceleration sensor 243 may sense information on a moving speed of the remote control device 200. Moreover, the remote control device 200 may further include a distance measurement sensor and sense a distance to the display unit 180 of the display device 100.

The output unit 250 may output image or voice signals in response to manipulation of the user input unit 230 or image or voice signals corresponding to signals transmitted from the display device 100. A user can recognize whether the user input unit 230 is manipulated or the video display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and, if the remote control device 200 does not move for a predetermined time, stops supplying power, so that power waste can be reduced. The power supply unit 260 may resume the power supply if a predetermined key provided at the remote control device 200 is manipulated.

The storage unit 270 may store various types of programs and application data necessary for control or operation of the remote control device 200. If the remote control device 200 transmits/receives signals wirelessly through the display device 100 and the RF module 221, the remote control device 200 and the display device 100 transmit/receive signals through a predetermined frequency band.

The control unit 280 of the remote control device 200 may store, in the storage unit 270, information on a frequency band for transmitting/receiving signals wirelessly to/from the video display device 100 paired with the remote control device 200 and refer to the information.

The control unit 280 controls general matters related to control of the remote control device 200. The control unit 280 may transmit a signal corresponding to a predetermined key manipulation of the user input unit 230 or a signal corresponding to a movement of the remote control device 200 sensed by the sensor unit 240 to the display device 100 through the wireless communication unit 220.

Additionally, the voice acquisition unit 290 of the remote control device 200 may obtain voice.

The voice acquisition unit 290 may include at least one microphone 291 and acquire voice through the microphone 291.

Figure 4:
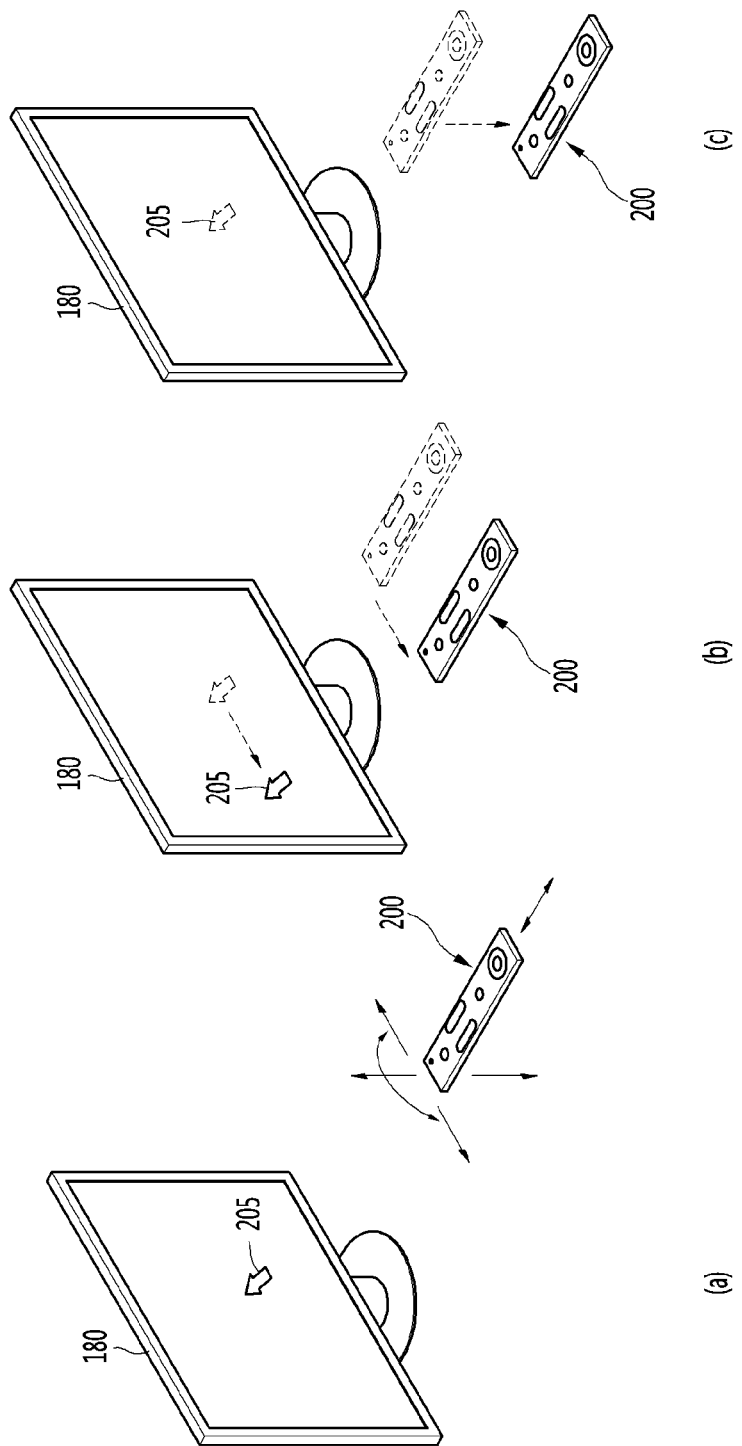
FIG. 4 illustrates an example of utilizing the remote control device according to an embodiment of the present disclosure.

Next, FIG. 4 is described.

FIG. 4 illustrates an example of utilizing the remote control device according to an embodiment of the present disclosure.

FIG. 4A illustrates an example in which a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may also be referred to as a spatial remote control device.

FIG. 4B illustrates an example in which if a user moves the remote control device 200 to the left, the pointer 205 displayed on the display unit 180 of the display device 100 is also moved to the left according to the movement of the remote control device 200.

Information on the movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4C illustrates an example in which while a specific button in the remote control device 200 is pressed, a user moves the remote control device 200 away from the display unit 180. Due to this, a selection area in the display unit 180 corresponding to the pointer 205 may be zoomed in and displayed in an enlarged size.

On the contrary, if a user moves the remote control device 200 closer to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

On the other hand, the pointer in this specification means an object displayed on the display unit 180 in response to the operation of the remote control device 200. Accordingly, besides an arrow form displayed as the pointer 205 in the drawing, various forms of objects are possible. For example, the above concept includes a point, a cursor, a prompt, and a thick outline. The pointer 205 may be displayed in correspondence to one point of a horizontal axis and a vertical axis on the display unit 180 and also can be displayed in correspondence to a plurality of points such as a line and a surface.

Next, a method of operating a system according to an embodiment of the present invention will be described with reference to FIG. 5.

Figure 5:
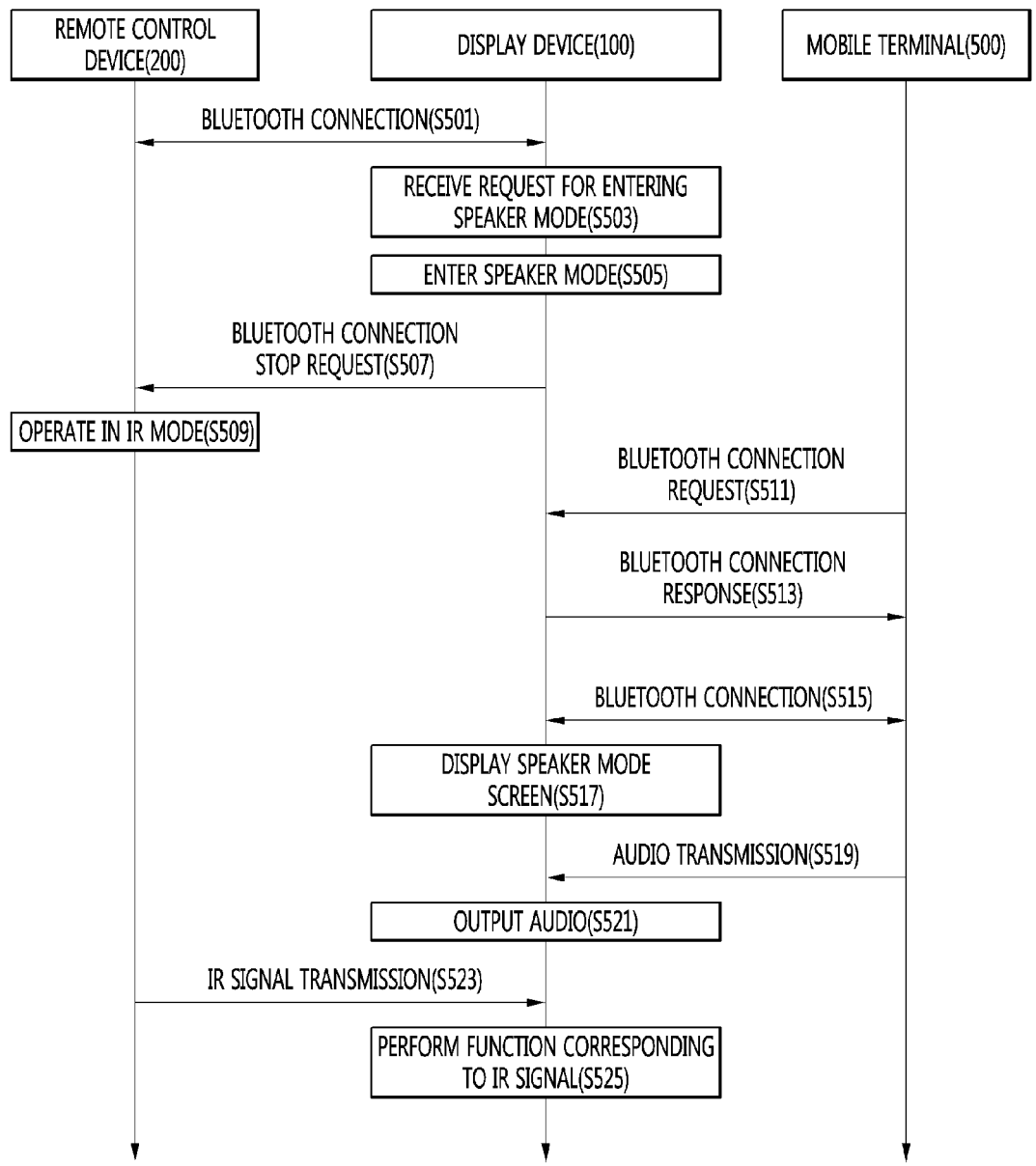
FIG. 5 is a ladder diagram illustrating a method of operating a system according to an embodiment of the present invention.

FIG. 5 is a ladder diagram illustrating a method of operating a system according to an embodiment of the present invention.

Referring to FIG. 5, first, the wireless communication unit 173 of the display device 100 is connected to the wireless communication unit 220 of the remote control device 200 through Bluetooth communication (S501).

For Bluetooth connection between the display device 100 and the remote control device 200, the wireless communication unit 173 of the display device 100 may include a Bluetooth module (not shown).

The controller 170 of the display device 100 receives a request for entering a speaker mode (S503), and the display device 100 enters the speaker mode according to the received request (S505).

In one embodiment, the speaker mode may refer to a mode in which the display device 100 may output audio received from an external device. The speaker mode means that the display device 100 serves as a speaker.

In the speaker mode, the display device 100 is a sink device of Bluetooth communication and the external device for providing audio is a source device.

Hereinafter, assume that the external device Bluetooth-connected to the display device 100 is a mobile terminal 500.

The mobile terminal 500 described in this specification may be any one of a mobile phone, a smartphone, a laptop computer, a digital broadcast terminal, a personal digital assistant (PDA), a portable multimedia player (PMP), a navigation system, a slate PC, a tablet PC, an ultrabook, a wearable device, e.g., a smartwatch, smart glasses and a head mounted display (HMD).

The speaker mode may be referred to as a sound sharing mode because audio output from the external device is received and output by the display device 100.

Steps S501 to S505 will be described with reference to the following figures.

Figure 6A:
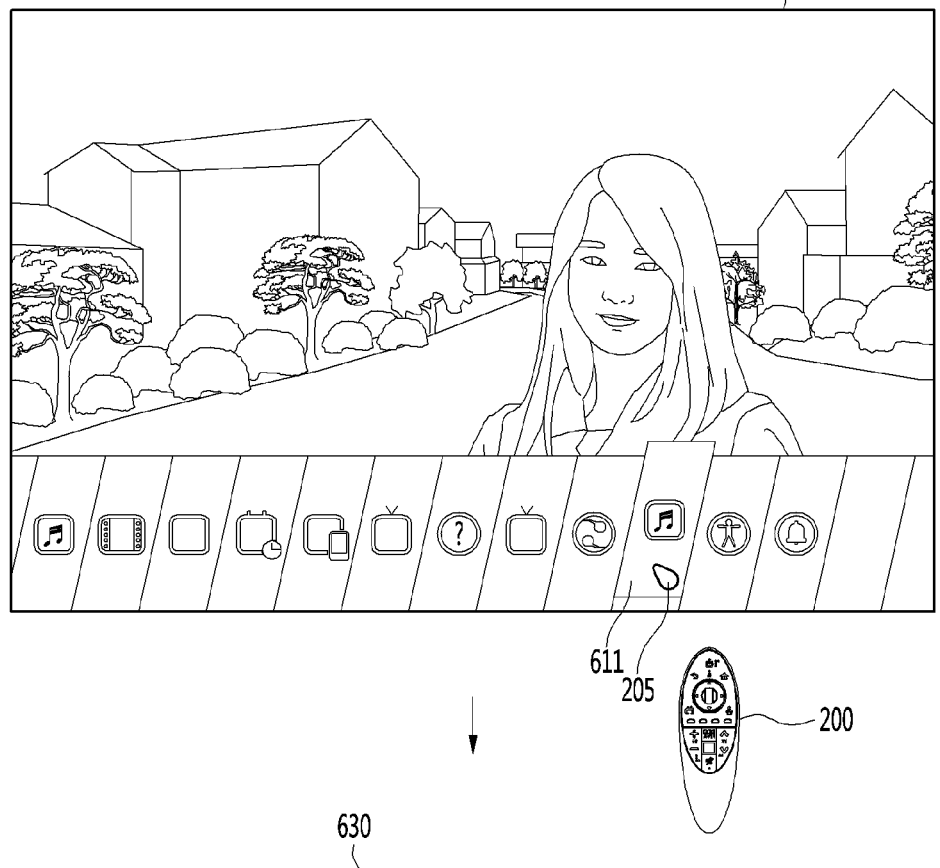
FIGS. 6a to 6c are diagrams illustrating a process of entering a speaker mode of a display device according to an embodiment of the present invention.
Figure 6B:
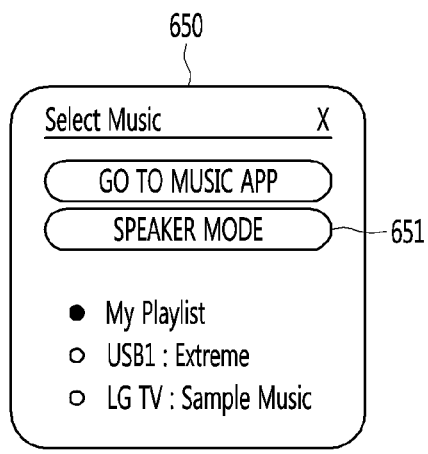
Figure 6C:
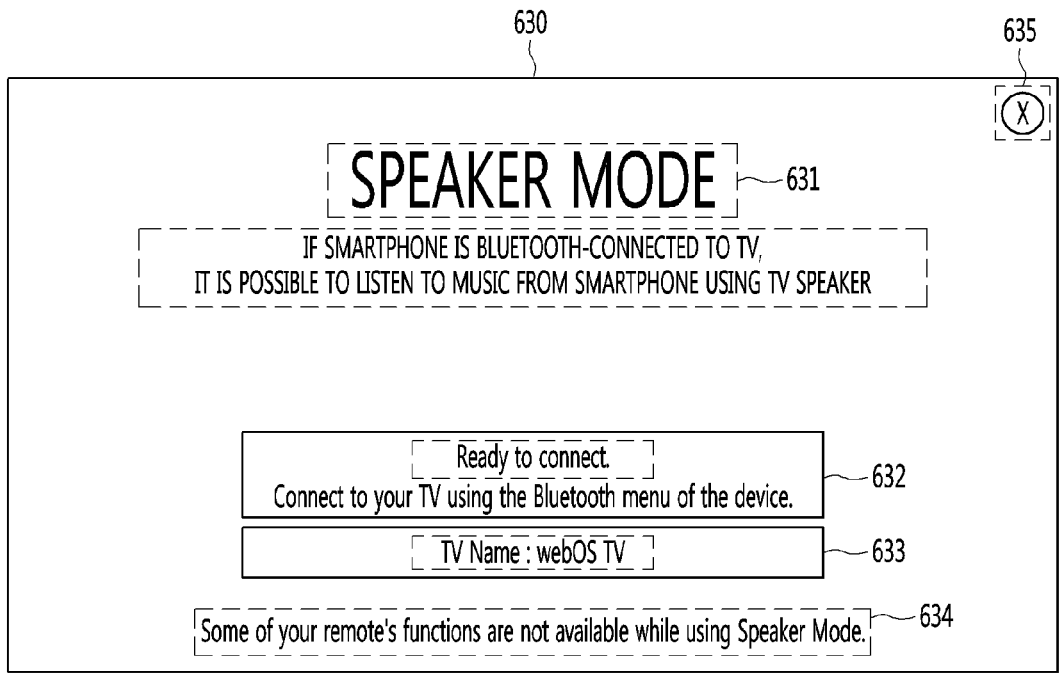

FIGS. 6a to 6c are diagrams illustrating a process of entering a speaker mode of a display device according to an embodiment of the present invention.

Referring to FIG. 6, the display unit 180 of the display device 100 displays a launcher screen 610.

The launcher screen 610 may be an initial screen displayed if the display device 100 is turned on. The launcher screen 610 may include a broadcast video and app icons corresponding to applications.

The launcher screen 610 may include a sound sharing app icon 611 for entering the speaker mode.

The controller 170 may receive a request for selecting the sound sharing app icon 611 from the remote control device 200. At this time, the display device 100 may receive the request for selecting the sound sharing app icon 611 from the remote control device 200 through Bluetooth communication.

This is because the display device 100 performs communication through Bluetooth connection with the remote control device 200 before the display device 100 enters the speaker mode.

Meanwhile, a pointer 205 moving in correspondence with movement of the remote control device 200 is displayed on the launcher screen 610.

A user may select the sound sharing app icon 205 through the pointer 205 such that the display device 100 enters the speaker mode.

If the display device 100 enters the speaker mode, the controller 170 may display a speaker mode entrance screen 630.

A message indicating that the display device is ready to be connected with the external device, a message for requesting connection with the display device 100 through the external device, a name (or an identifier) of the display device 100 may be displayed on the speaker mode entrance screen 630.

Meanwhile, although the example in which the display device 100 operates in the speaker mode according to the request for selecting the sound sharing app icon 205 is described in FIG. 6a, the present invention is not limited thereto and the display device 100 may enter the speaker mode according to a request for selecting a speaker mode item from a menu item.

For example, as shown in FIG. 6b, the controller 170 may display a music selection menu item 650 according to execution of an application of a music player.

The music selection menu item 650 may include a speaker mode item 651.

If the speaker mode item 651 is selected, the controller 170 may enable the display device 100 to enter the speaker mode.

FIG. 6c is a diagram showing the detailed configuration of the speaker mode entrance screen 630.

The speaker mode entrance screen 630 may display a speaker mode name 631 indicating entrance to the speaker mode, a connection guide 632 for guiding Bluetooth connection with the mobile terminal 500, an identification name 633 of the display device 100, a function restriction text 634 indicating that some functions of the remote control device 200 may be restricted, and an end button 635 for ending the speaker mode entrance screen 630.

The pointer 205 is not displayed on the speaker mode entrance screen 630, because Bluetooth connection between the display device 100 and the mobile terminal 500 is broken as the display device 100 enters the speaker mode.

In this case, the remote control device 200 may transmit an IR signal to the display device 100 to perform communication, which will be described below.

FIG. 5 will be described again.

The controller 170 of the display device 100 transmits a request for stopping Bluetooth connection to the remote control device 200 as the display device 100 enters the speaker mode (S507).

The controller 170 may break Bluetooth connection with the remote control device 200, in order to prevent the display device 100 from being simultaneously Bluetooth-connected to the remote control device 200 and the mobile terminal 500.

If the display device 100 is simultaneously Bluetooth-connected to the remote control device 200 and the mobile terminal 500, an available channel through adaptive frequency hopping may be frequently moved and thus performance of the Bluetooth module provided in the display device 100 may be deteriorated.

This will be described with reference to FIG. 7.

Figure 7:
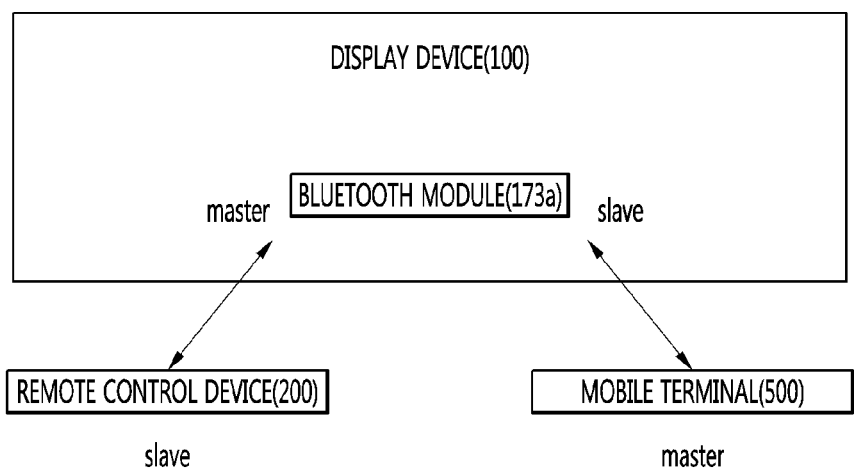
FIG. 7 is a diagram illustrating problems generated if a display device is Bluetooth-connected to a mobile terminal in a state of being Bluetooth-connected to a remote control device.

FIG. 7 is a diagram illustrating problems generated if a display device is Bluetooth-connected to a mobile terminal in a state of being Bluetooth-connected to a remote control device.

Referring to FIG. 7, the display device 100 may include a Bluetooth module 173.

The display device 100 and the remote control device 200 may perform bidirectional communication through Bluetooth connection.

The pointer 205 may be displayed on the display unit 180 of the display device 100 as shown in FIG. 6 and the pointer 205 may move in correspondence with movement of the remote control device 200.

The display device 100 may receive movement information indicating movement of the remote control device 200 through Bluetooth communication and control movement of the pointer 205 based on the received movement information.

The display device 100 may become a master device and the remote control device 200 may become a slave device, upon being Bluetooth-connected to the remote control device 200.

According to a Bluetooth communication protocol, after the devices are connected, any one device may search for an available channel through adaptive frequency hopping.

The master device may search for the available channel through adaptive frequency hopping.

In particular, if one master device and a plurality of slave devices are connected, the master device may search for available channels for Bluetooth communication with the slave devices.

In particular, since the display device 100 such as a TV may be connected to a plurality of Bluetooth devices and the display device may become a master device, thereby searching for available channels.

That is, in a relation between the display device 100 and the remote control device 200, the display device 100 may operate as a master device and the remote control device 200 may operate as a slave device.

However, if the display device 100 enters the speaker mode, from the viewpoint of Bluetooth connection, the display device 100 may operate as a slave device and the mobile terminal 500 may operate as a master device.

In this case, the display device 100 may operate as a master device of the remote control device 200 and operate as a slave device of the mobile terminal 500. This is referred to as a scatternet.

In a scatternet, the display device 100 may search for the available channel for Bluetooth connection with the remote control device 200, but the mobile terminal 500 may search for the available channel for Bluetooth connection with the mobile terminal 500.

If the display device 100 searches for the available channel for Bluetooth connection with the remote control device 200, Bluetooth connection between the display device 100 and the mobile terminal 500 is intermittently broken and output of audio received from the mobile terminal 500 is stopped.

In contrast, if the mobile terminal 500 searches for the available channel in connection between the display device 100 and the mobile terminal 500, Bluetooth connection between the display device 100 and the remote control device 200 is intermittently broken and the pointer 205 is not naturally and smoothly moved.

The display device 100 may transmit a Bluetooth connection stop request to the remote control device 200, for breaking Bluetooth connection with the remote control device 200.

Therefore, Bluetooth connection between the display device 100 and the remote control device 200 may be broken.

As Bluetooth connection between the display device 100 and the remote control device 200 is broken, the display device 100 may be Bluetooth-connected to the mobile terminal 500.

FIG. 5 will be described again.

The remote control device 200 operates in an IR mode according to the Bluetooth connection stop request received from the display device 100 (S509).

In one embodiment, the IR mode may refer to a mode for enabling the remote control device 200 to perform communication with the display device 100 through the IR module 223.

The IR module 223 of the remote control device 200 may transmit the IR signal to the display device 100 and the display device 100 may perform a function corresponding to the received IR signal.

If Bluetooth connection between the display device 100 and the remote control device 200 is broken and the remote control device 200 operates in the IR mode, the pointer 205 displayed on the display unit 180 may not be displayed, because control of movement and selection of the pointer 205 is performed through Bluetooth connection.

If the remote control device 200 operates in the IR mode, the user may use only the check button 238, the volume control button 235, the power button 231, the left/right/upper/lower direction button (not shown) and the exit button (not shown) shown in FIG. 3.

That is, if Bluetooth connection between the display device 100 and the remote control device 200 is broken, a voice recognition function and a function for controlling the pointer 205, both of which can be performed through Bluetooth connection, may be restricted.

The controller 170 of the display device 100 receives a Bluetooth connection request from the mobile terminal 500 through the wireless communication unit 173 (S511), and transmits a Bluetooth connection response for allowing Bluetooth connection in response to the received Bluetooth connection request (S513).

Then, the display device 100 and the mobile terminal 500 are Bluetooth-connected (S515).

If the display device 100 and the mobile terminal 500 are Bluetooth-connected, the display device 100 may operate as a sink device and the mobile terminal 500 may operate as a source device.

The source device may provide media content and the sink device may receive and play the media content provided by the source device.

The controller 170 of the display device 100 displays a speaker mode screen on the display unit 180 in the speaker mode upon Bluetooth connection with the mobile terminal 500 (S517).

In one embodiment, the speaker mode screen may be a screen for controlling reproduction of audio received from the mobile terminal 500 Bluetooth-connected to the display device 100.

The speaker mode screen will be described below.

The controller 170 of the display device 100 receives audio output from the mobile terminal 500 (S519) and outputs the received audio through the audio output unit 185 (S521).

Meanwhile, the controller 170 of the display device 100 receives the IR signal from the remote control device 200 (S523) and performs a function corresponding to the received IR signal (S525).

Hereinafter, a process of Bluetooth-connecting the display device 100 with the mobile terminal 500 and a process of providing a speaker mode screen according to Bluetooth connection and, at the display device 100, reproducing audio received from the mobile terminal 500 will be described.

Figure 8:
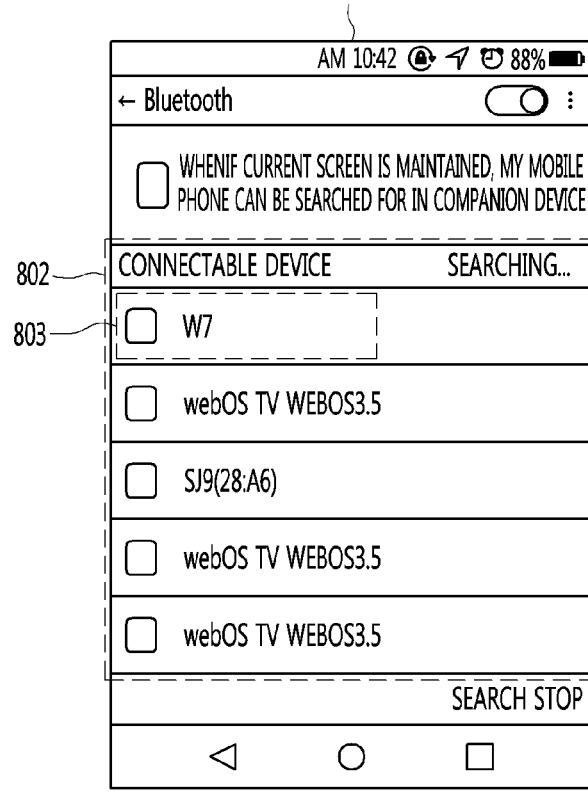
FIGS. 8 to 9 are diagrams illustrating a process of Bluetooth-connecting a display device with a mobile terminal according to a Bluetooth connection request of the mobile terminal on a speaker mode entrance screen according to an embodiment of the present invention.
Figure 9:
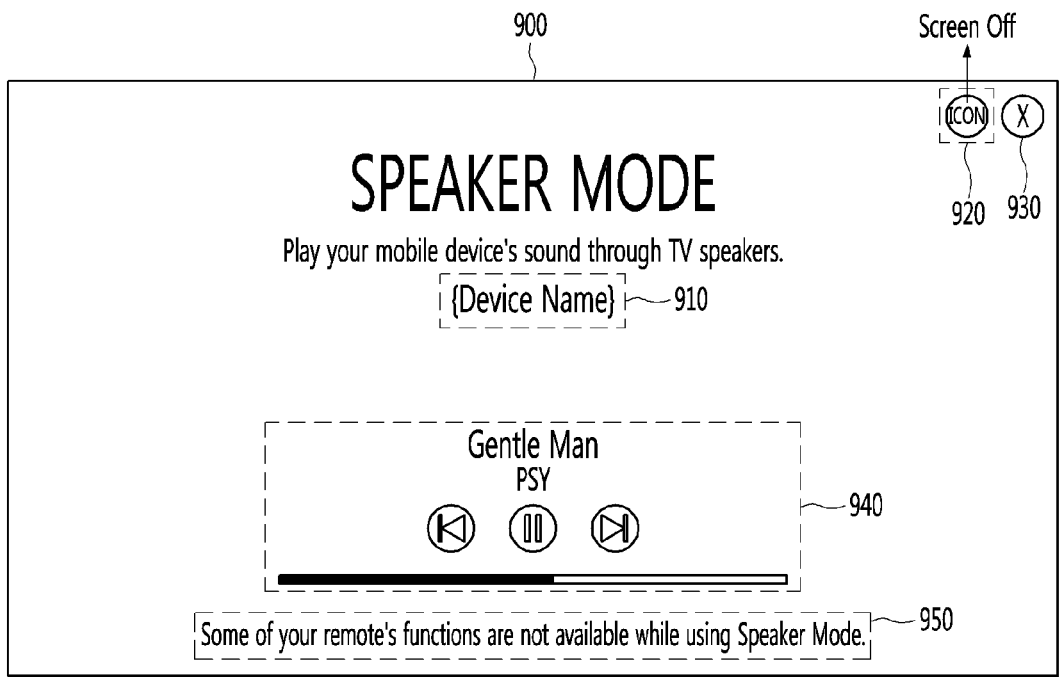

FIGS. 8 to 9 are diagrams illustrating a process of Bluetooth-connecting a display device with a mobile terminal according to a Bluetooth connection request of the mobile terminal on a speaker mode entrance screen according to an embodiment of the present invention.

In FIG. 8, assume that the display device 100 operates in the speaker mode. That is, Bluetooth connection between the display device 100 and the remote control device 200 is broken.

The mobile terminal 500 displays a connectable device list 802 including information on Bluetooth devices connectable thereto.

If the device name 803 is selected from the connectable device list 802, the mobile terminal 500 may transmit a Bluetooth connection request to a device corresponding to the device name 803.

If the device 803 is the display device 100, the mobile terminal 500 may transmit the Bluetooth connection request to the display device 100.

The display device 100 may display a popup window 800 indicating a connection request on the speaker mode entrance screen 630 according to the Bluetooth connection request received from the mobile terminal 500.

The popup window 800 may include the identification name of the mobile terminal 550, which has transmitted the Bluetooth connection request, and text asking about whether to listen to the audio provided by the mobile terminal 500.

If a YES button 801 included in the popup window 800 is selected, the display device 100 may transmit a Bluetooth connection response for accepting Bluetooth connection to the mobile terminal 500.

Therefore, the display device 100 may be Bluetooth-connected to the mobile terminal 500.

If the display device 100 and the mobile terminal 500 are Bluetooth-connected, the display device 100 may operate as a sink device and the mobile terminal 500 may operate as a source device.

The mobile terminal 500 may transmit the currently output audio to the display device 100.

The display device 100 may receive the audio output from the mobile terminal 500 and output the received audio through the audio output unit 185 in real time.

Meanwhile, if the display device 100 and the mobile terminal 500 are Bluetooth-connected, the display device 100 may display a speaker mode screen 900 shown in FIG. 9.

That is, the screen displayed by the display device 100 may be switched from the speaker mode entrance screen 630 to the speaker mode screen 900.

The speaker mode screen 900 may include a source name 910 for identifying the mobile terminal 500 Bluetooth-connected to the display device 100, a screen off button 920 for turning the screen of the display unit 180 off, an end button 930 for ending the speaker mode, an audio playback window 940 for controlling reproduction of the audio received from the mobile terminal 500 and a function restriction text 950 indicating that some functions of the remote control device 200 may be restricted in the speaker mode.

If the screen off button 920 is selected, the controller 170 may turn the screen of the display unit 180 off. Therefore, the display unit 180 may display a black screen.

If the end button 930 is selected, the controller 170 may end the speaker mode of the display device 100. If the end button 930 is selected, the controller 170 may release Bluetooth connection with the mobile terminal 500 and restore Bluetooth connection with the remote control device 200.

The audio playback window 940 may include information on the audio received from mobile terminal 500 (singer and song title), buttons for controlling audio playback (a next song play button, a previous song play button and a stop button) and a progress bar.

Meanwhile, the pointer 205 is not displayed on the speaker mode screen 900, because the pointer 205 is displayed only if the display device 100 and the remote control device 200 are Bluetooth-connected.

The display device 100 may select the screen off button 920, the end button 930 and the buttons included in the audio playback window 940 through the IR signal received from the remote control device 200.

Since the pointer 205 is not displayed on the speaker mode screen 900, the user may select the above-described buttons through direction keys and an OK button.

Since the user cannot use a function for controlling the pointer 205 and a voice recognition function using the remote control device 200 in the speaker mode of the display device 100, a function restriction text 950 may be displayed on the speaker mode screen 900.

According to the embodiment of the present invention, the display device 100 breaks Bluetooth connection with the remote control device 200 in the speaker mode and thus seamlessly outputs the audio received from the mobile terminal 500.

The user may seamlessly listen to music output from the mobile terminal 500 using the display device 100 including the speaker having better performance.

Meanwhile, the display device 100 may receive a request for entering the speaker mode while being connected with the sound bar to operate as a source device without operating in the speaker mode.

Figure 10:
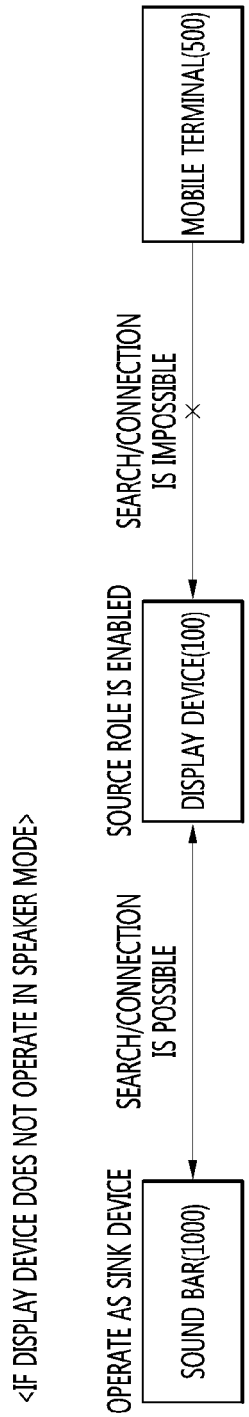
Figure 12:
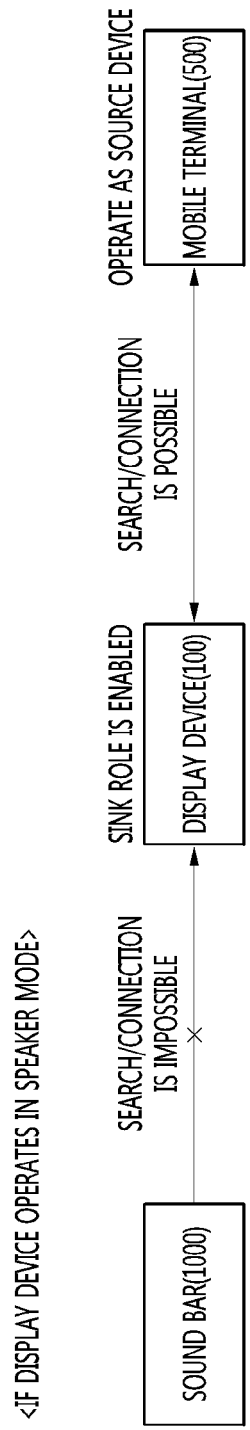

FIGS. 10 to 12 are diagrams illustrating operation performed if a request for entering a speaker mode is received in a state in which a display device is connected to a sound bar according to an embodiment of the present invention.

In FIG. 10, assume that the display device 100 does not operate in the speaker mode and the role of the source device is enabled (activated).

In this case, search for Bluetooth communication between the display device 100 and the sound bar 1000 operating as a sink device and connection between the display device and the sound bar are possible.

In the Bluetooth communication protocol, one device may operate as any one of the source device or the sink device and cannot operate as both the source device and the sink device.

Therefore, the mobile terminal 500 which will operate as the source device may not perform search for Bluetooth communication with the display device 100 operating as the source device and connection to the display device.

Meanwhile, the display device 100 may be connected to the sound bar 1000 and receive the request for entering the speaker mode in a state of operating as the source device.

The display device 100 may display a popup window 1100, which indicates that an external speaker and a sound sharing function cannot be simultaneously used and inquires about whether to execute the sound sharing function, on the launcher screen (see FIG. 6) according to the request for entering the speaker mode as shown in FIG. 11.

This may indicate that the display device 100 cannot simultaneously operate as the source device and the sink device.

If a request for allowing the sound sharing function (speaker mode) is received, the display device 100 may break Bluetooth connection with the sound bar 1000.

Therefore, the display device 100 may enter the speaker mode as shown in FIG. 12 to enable the role of the sink device.

The display device 100 may perform search for Bluetooth communication with the mobile terminal 500 operating as the source device and connection to the mobile terminal.

In contrast, the sound bar 1000 may not perform search for Bluetooth communication with the display device 100 and connection to the display device.

Figure 13:
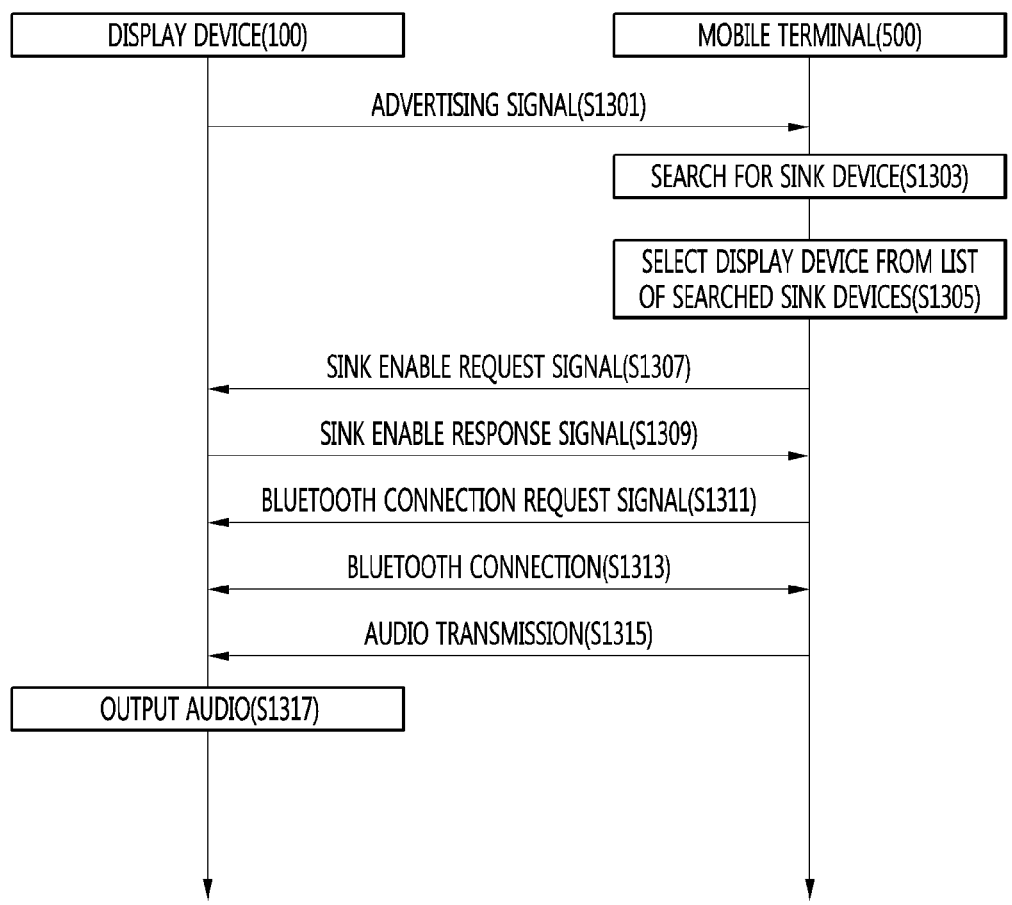
FIG. 13 is a ladder diagram illustrating a process of switching a role of a display device from a source device to a sink device according to an embodiment of the present invention.

FIG. 13 is a ladder diagram illustrating a process of switching a role of a display device from a source device to a sink device according to an embodiment of the present invention.

In particular, FIG. 13 is a diagram illustrating an embodiment in which the user selects a sound app icon or switches the operation mode of the display device 100 to the speaker mode using the mobile terminal 500 without selecting the speaker mode item from the menu item as in the embodiment of FIG. 6.

Referring to FIG. 13, the controller 170 of the display device 100 externally transmits an advertising signal through the Bluetooth module 173a (S1301).

In one embodiment, the advertising signal (or a broadcasting signal) may include one or more of operation state information indicating whether the display device 100 operates as a source or sink device, and Bluetooth MAC address information.

For example, the operation state information included in the advertising signal may be represented as follows.

<ad2p source available: true, ad2p sink available: false>

The above-described operation state information may indicate that the display device 100 operates as the source device.

The controller 170 of the display device 100 may periodically transmit the advertising signal.

Since the advertising signal should be transmitted periodically, in order to prevent excess power consumption, the controller 170 may externally transmit the advertising signal according to a low-power Bluetooth communication protocol.

The mobile terminal 500 receives the adverting signal and searches for a sink device (S1303).

The mobile terminal 500 may receive the advertising signal from a neighboring device and search for devices capable of operating as the sink device through Bluetooth connection, using the received advertising signal.

The mobile terminal 500 may search devices operating as the sink device using the advertising signal transmitted according to Bluetooth legacy or low-power Bluetooth protocol.

The mobile terminal 500 may align a list of devices repeatedly searched based on Bluetooth legacy and low-power Bluetooth protocol by giving priority to Bluetooth legacy, according to a result of comparing the Bluetooth MAC address included in the advertising signal with a previously stored Bluetooth MAC address.

The mobile terminal 500 selects the display device 100 from the list of the searched sink devices (S1305).

That is, the mobile terminal 500 may receive a request for selecting the display device 100 which will operate as the sink device from the list of sink devices.

The mobile terminal 500 transmits a sink enable request signal for enabling the selected display device 100 to operate as the sink device to the display device 100 (S1307).

Since the display device 100 currently operates as the source device, the mobile terminal 500 may transmit a sink enable (activation) request signal to the display device 100 in order to switch the role of the display device 100 from the source device to the sink device.

The sink enable request signal may be transmitted to display device 100 according to the low-power Bluetooth protocol.

The controller 170 of the display device 100 switches the role of the display device from the source device to the sink device according to the received sink enable request signal and transmits, to the mobile terminal 500, a sink enable response signal indicating that sink enable operation is completed (S1309).

Therefore, the display device 100 is ready to operate as the sink device.

The sink enable response signal may also be transmitted to the mobile terminal 500 according to the low-power Bluetooth protocol.

The mobile terminal 500 transmits a Bluetooth connection request signal to the display device 100 after receiving the sink enable response signal (S1311), and thus the display device 100 and the mobile terminal 500 are Bluetooth-connected to each other (S1313).

The display device 100 receives the audio played by the mobile terminal 500 (S1315), and outputs the received audio through the audio output unit 185 (S1317).

In general, the Bluetooth device cannot simultaneously operate as the source device and the sink device.

Accordingly, if the role of the display device 100 operating as the sink device is disabled, Bluetooth connection with the display device cannot be performed on the mobile terminal 500.

However, according to the embodiment of FIG. 13, the role of the display device 100 may be switched from the sink device to the source device according to the sink enable request signal of the mobile terminal 500.

Therefore, the user may easily switch the role of the display device 100 from the sink device to the source device by manipulating only the mobile terminal 500 without providing the speaker mode entrance request to the display device 100.

According to various embodiments of the present invention, if the display device operates in the speaker mode, it is possible to seamlessly output audio received from the mobile terminal. Therefore, a user can listen to naturally output audio.

According to an embodiment, the above-described method can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

As can be seen from the foregoing, the video display device in accordance with the embodiments is not limited to the configuration and method of the embodiments described above, but all or some components of the embodiments may be configured to be selectively combined such that various modifications of the embodiments can be implemented.

What is claimed is:

1. A display device comprising:
   a display;
   a Bluetooth module configured to perform Bluetooth communication with a remote control device or a mobile terminal;
   an infrared (IR) module configured to receive IR signals from the remote control device; and
   a controller configured to:
      display, on the display, a pointer to be moved according to a movement of the remote control device, wherein movement of the pointer is based on movement information of the remote control device received via Bluetooth communication;
      change the display device to a speaker mode for outputting audio received from the mobile terminal according to a control command;
      transmit, to the remote control device via the Bluetooth module, a wireless connection stop request signal for disconnecting a Bluetooth connection with the remote control device when the display device receives a control command for entering the speaker mode;
      cease display of the pointer according to entering the speaker mode, and
      while in the speaker mode, receive control commands from the remote control device via the IR module and not via the Bluetooth module and execute functions corresponding to the received control commands.

2. The display device according to claim 1, further comprising an audio output configured to output audio, wherein the controller is further configured to:
   establish the Bluetooth connection with the mobile terminal according to a Bluetooth connection request received from the mobile terminal;
   receive the audio from the mobile terminal via the Bluetooth connection; and
   control the audio output to output the received audio.

3. The display device according to claim 1, wherein the controller is further configured to change the display device to the speaker mode when an audio sharing icon displayed on the display is selected.

4. The display device according to claim 1, wherein the controller is further configured to
   control the display to display a speaker mode entrance screen indicating the change to the speaker mode.

5. The display device according to claim 4, further comprising an audio output configured to output the audio, wherein the controller is further configured to:
   control the audio output to output the received audio; and
   control the display to display a speaker mode screen while the display device is in the speaker mode, wherein the speaker mode screen comprises controls for controlling playback of the audio being output.

6. The display device according to claim 5, wherein the speaker mode screen comprises:
   identifying information of the mobile terminal;
   an audio playback window for controlling playback of the audio being output;
   a screen off option for turning the display of the display device off;
   a mode end option for ending the speaker mode; and
   a function restriction option indicating that some functions of the remote control device are unavailable in the speaker mode.

7. The display device according to claim 6, wherein the controller is further configured to receive a selection of the audio playback window, the screen off option, or the mode end option according to a signal received from the remote control device via the IR module.

8. The display device according to claim 1, wherein one or more functions of the remote control device are performed using the Bluetooth connection between the display device and the remote control device.

9. The display device according to claim 8, wherein the one or more functions of the remote control device comprise controlling a pointer displayed at the display device and a voice recognition function of a voice input received at the remote control device.

10. The display device according to claim 6, wherein the controller is further configured to turn off the display and control the audio output to continue outputting the audio being output while the display is turned off in response to a selection of the screen off option.

11. The display device according to claim 6, wherein the controller is further configured to:
    terminate the speaker mode;
    disconnect the Bluetooth connection with the mobile terminal; and
    re-establish the Bluetooth connection with the remote control device in response to a selection of the mode end option.

12. The display device according to claim 1, wherein the controller is further configured to control the display to display a popup window requesting confirmation to establish a Bluetooth connection with the mobile terminal to enter the speaker mode, wherein the mobile terminal operates as a source device in the Bluetooth connection.

13. The display device according to claim 1, wherein the controller is further configured to:
    transmit, to the mobile terminal via the Bluetooth module, a Bluetooth advertising signal indicating that the display device operates as a source device;
    in response to the Bluetooth advertising signal, receive a sink enable request signal from the mobile terminal via the Bluetooth module for switching the display device to operate as a sink device for changing the display device to the speaker mode; and
    switch the display device from operating as the source device to operating as the sink device in the speaker mode according to the received sink enable request signal.

14. The display device according to claim 13, wherein the controller is further configured to:
    transmit a sink enable response signal to the mobile terminal via the Bluetooth module in response to the sink enable request signal after stopping a transmission of the Bluetooth advertising signal; and establish a Bluetooth connection with the mobile terminal according to the Bluetooth connection request received from the mobile terminal.

15. The display device according to claim 14, wherein the Bluetooth advertising signal, the sink enable request signal, and the sink enable response signal are transmitted and received via the Bluetooth module according to a low-power Bluetooth communication protocol.

16. The display device according to claim 1, wherein the controller is further configured to:
- set the display device to operate as a sink device when the display device enters the speaker mode; and
- control an audio output of the display device to output audio received from the mobile terminal, wherein the mobile terminal operates as a source device.

* * * * *